Sept. 19, 1939.  H. W. HILL  2,173,651
MULTIFOCAL LENS AND METHOD OF MAKING THE SAME
Filed Jan. 21, 1937   3 Sheets-Sheet 1
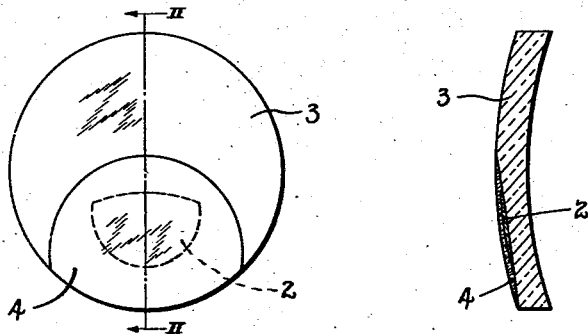
FIG. I  FIG. II
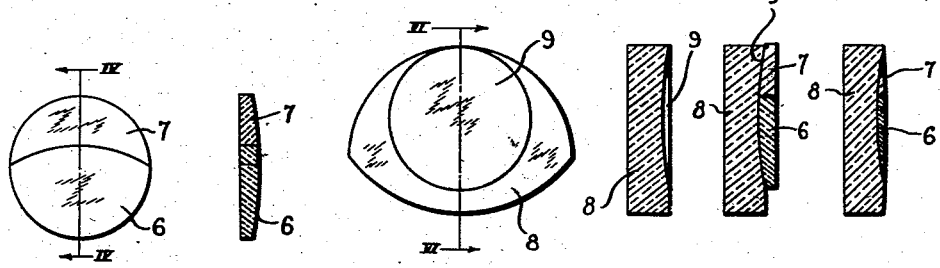
FIG. III  FIG. IV  FIG. V  FIG. VI  FIG. VII  FIG. VIII
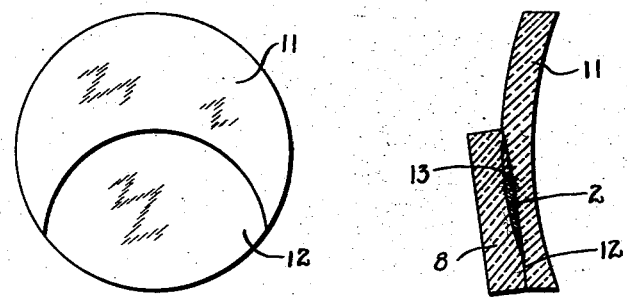
FIG. IX  FIG. X
INVENTOR
HARRY W. HILL
BY
Harry H. Styll
ATTORNEY Sept. 19, 1939.  H. W. HILL  2,173,651
MULTIFOCAL LENS AND METHOD OF MAKING THE SAME
Filed Jan. 21, 1937 3 Sheets-Sheet 2
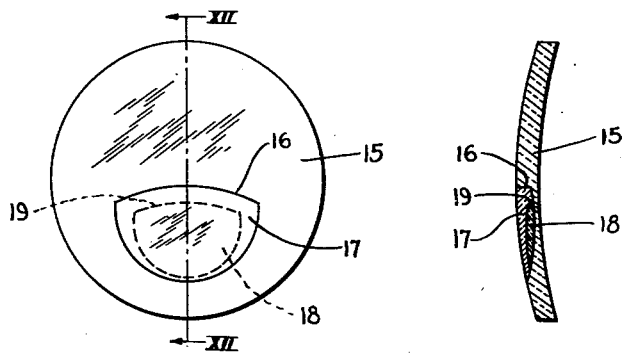
FIG. XI  FIG. XII
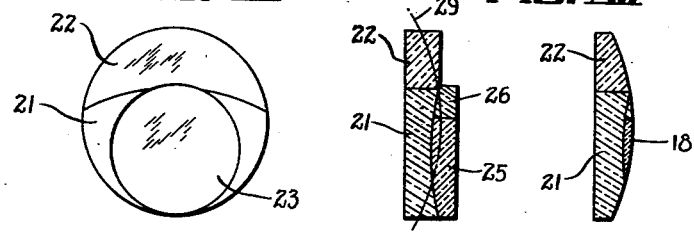
FIG. XIII  FIG. XIV  FIG. XV
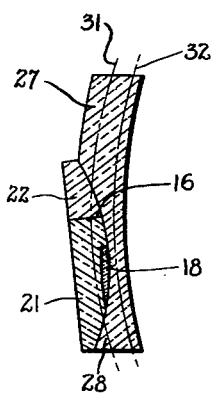
FIG. XVI
INVENTOR
HARRY W. HILL
BY
Harry H. Styll
ATTORNEY Sept. 19, 1939.  H. W. HILL  2,173,651
MULTIFOCAL LENS AND METHOD OF MAKING THE SAME
Filed Jan. 21, 1937  3 Sheets-Sheet 3
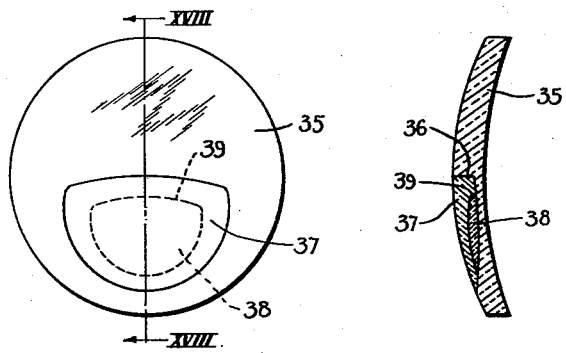
FIG. XVII  FIG. XVIII
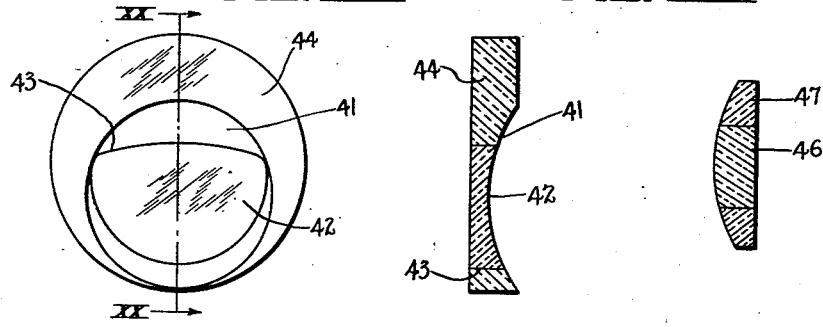
FIG. XIX  FIG. XX  FIG. XXI
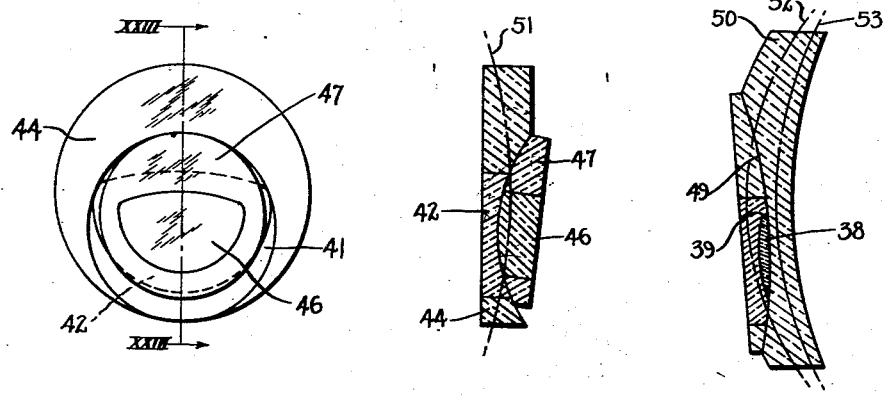
FIG. XXII  FIG. XXIII  FIG. XXIV
INVENTOR
HARRY W. HILL
BY
Harry H. Styll
ATTORNEY Patented Sept. 19, 1939

2,173,651

UNITED STATES PATENT OFFICE 2,173,651

MULTIFOCAL LENS AND METHOD OF MAKING THE SAME

Harry W. Hill, Southbridge, Mass., assignor to American Optical Company, Southbridge, Mass., a voluntary association of Massachusetts Application January 21, 1937, Serial No. 121,602

2 Claims. (Cl. 88—54)

This invention relates to multifocal lenses and to methods for making the same. More particularly the invention relates to the making of trifocal lenses.

An object of the invention is to facilitate making the reading portion and the intermediate vision portion of such shapes as are best accommodated to the requirements of the user.

In the accompanying drawings which illustrate my invention, Fig. I is a view in elevation of one form of trifocal lens embodying my invention;

Fig. II is a sectional view on the line II—II of Fig. I;

Fig. III is a view in elevation of a two-part button for use in making the reading portion of the trifocal lens;

Fig. IV is a sectional view on the line IV—IV of Fig. III;

Fig. V is a view in elevation of the minor portion which serves to provide the intermediate distance portion of the finished trifocal lens;

Fig. VI is a section on the line VI—VI of Fig. V;

Fig. VII is a sectional view of a composite of the minor portion and the two-part button;

Fig. VIII is a similar sectional view of this composite after a spherical surface has been formed on the button side of the composite;

Fig. IX is a view in elevation of the major portion of the blank with a countersink recess formed in one side thereof;

Fig. X is a sectional view showing the composite fused in this recess.

Figs. XI and XII are views similar to Figs. I and II of another embodiment of my invention;

Fig. XIII is a view in elevation of one two-part button having a countersink recess formed therein;

Fig. XIV is a sectional view of a composite of two two-part buttons, the second button being fused in the countersink recess of the first;

Fig. XV is a sectional view of the composite after a spherical surface has been formed on the side where the second button is fused;

Fig. XVI is a sectional view of this composite fused in a countersink recess in a major blank portion;

Figs. XVII and XVIII are views similar to Figs. XI and XII showing still another embodiment of my invention;

Fig. XIX is a view in elevation of a two-part button having a countersink recess formed in the face thereof;

Fig. XX is a sectional view on the line XX—XX of Fig. XIX and illustrating the way in which one part of the button is carried within the other part;

Fig. XXI is a sectional view through a second two-part button, one side of which has been provided with a spherical surface contrageneric to the countersink recess of the other button;

Fig. XXII is a view in elevation showing the two two-part buttons fused together;

Fig. XXIII is a sectional view on the line XXIII—XXIII of Fig. XXII; and

Fig. XXIV shows a major portion of glass with the composite of the two two-part buttons fused in a countersink therein.

Of the three embodiments of my invention illustrated in the drawings, the first incurs minimum prismatic effect or "jump" between the reading segment and the intermediate portion. The second and third forms carry this a step further and also provide minimum "jump" between the intermediate portion and the major portion of the lens. Of the three forms, the first is in general the simplest to manufacture and the second is somewhat simpler to manufacture than the third.

Referring to the first sheet of drawings, the trifocal lens illustrated comprises a reading segment 2 interposed between the distance portion 3 and the intermediate portion 4.

It will be obvious from the ensuing description of the manufacture of this form of trifocal that the order of the steps of manufacture is for the most part immaterial. Several parts must be prepared and it is optional which part is prepared first, and indeed in a plant having a considerable volume of production of multifocal lenses, some of the parts may be manufactured and kept in stock.

For instance, the two-part button illustrated in Figs. III and IV and made up of the parts 6 and 7 is of a type familiar to those engaged in the manufacture of multifocal lenses. Glass for the part 6 is selected of an index of refraction suitable for the reading segment of the finished lens. We here adopt the common designation for this segment 2, and it will be understood that the same may have a higher or lower index of refraction than the intermediate portion 4, according to the requirements of user. The glass for the part 7 is selected of an index of refraction sensibly the same as the minor portion 8 shown in Figs. V and VI.

This minor portion 8 is provided with a countersink recess 9. The button 6, 7 is provided with a surface substantially contrageneric to the countersink recess 9, (see Fig. IV) and the two-part button is fused or in other suitable manner secured in the latter (see Fig. VII). The major blank portion 11 is also provided with a countersink recess 12 for receiving the composite of the minor portion 8 and the two-part button 6, 7. The composite is provided on its button side with a surface contrageneric to the countersink recess 12, (see Fig. VIII). The composite is then fused in this countersink recess to produce the rough blank illustrated in Fig. X.

Comparing Figs. VII, VIII and X, it will be noted that the part 7 of the button, being of the same index of refraction as the minor portion 8, has in the course of fusion become substantially integral with the minor portion 8. The rough blank illustrated in Fig. X comprises the segment 2 in finished form, and the minor portion 8 fused to the major portion 11. The countersink recess 12 remains as a substantially continuous surface of separation between glasses of dissimilar indices of refraction. The segment 2 is embedded in the face of the minor portion 8 which lies against this recess 12. Moreover, this segment 2 has a shoulder 13 along at least a portion of its edge, which shoulder is buried in the minor portion 8.

This rough blank is ground and polished according to customary practice for forming a continuous optical surface on the segment side of the blank, herein the convex side, and for forming a continuous optical surface of the required power on the opposed side of the blank, herein the concave side, so as to complete the lens. One of these continuous optical surfaces will generally be placed on the blank at the factory and the other will in general be formed by the dispenser at the time the prescription is filled.

The modification of my invention illustrated on the second sheet of drawings is in principle generally the same as the first modification. The major blank portion 15 has a countersink recess therein along an edge of which is a shoulder 16 against which abuts the intermediate portion 17 of the trifocal lens. The reading segment 18 lies embedded in the intermediate portion 17 between that portion and the major portion 15. This segment 18 has a buried shoulder 19 similarly as in the first embodiment.

Referring to Figs. XIII to XVI inclusive of the drawings, the manner in which this form of trifocal lens may be produced is readily understood. A two-part button is prepared with a countersink recess, this button having a part 21 of glass of an index of refraction suitable for the intermediate field of the trifocal lens and a part 22 of glass of sensibly the same index of refraction as the major portion 15. The countersink recess 23 is mostly formed in the part 21, although no injury is brought about by allowing it to overlap slightly the part 22. A second button is prepared with a spherical surface contrageneric to the countersink recess 23. This button has a part 25 of glass of an index of refraction suitable for the segment 18 and a part 26 of glass of an index refraction sensibly the same as that of the part 21. The two two-part buttons are secured together as by a fusing process, the composite thus produced being shown in Fig. XIV. The major blank portion 27 is provided with a countersink recess 28 as in the first embodiment; and the composite above referred to is surfaced to produce a spherical surface on the side thereof carrying the two-part button 25—26. An arc 29 is marked on Fig. XIV to indicate this spherical surface, because care must be taken to insure that none of the glass 26 be left overlapping the glass 22. In other words, the arc 29 must pass through the surface of separation between the parts 21 and 22 of the larger two-part button.

The composite thus surfaced is fused in the countersink recess 28 to obtain the rough blank shown in Fig. XVI. It will be noted that the segment 18 is in finished form. It will also be noted that the countersink recess 28 is not continuous after the last mentioned fusing but ends at the shoulder 16. This is because the glass 22 is of sensibly the same index of refraction as the glass 27 and becomes substantially integral therewith in fusing.

The rough blank is formed with a continuous optical surface on the segment side of the blank, herein the convex side, and this surface is indicated by the arc 31 in Fig. XVI. The lens is completed by forming on the opposed side of the blank a continuous optical surface indicated by the arc 32. The first, indicated by the arc 31, is generally formed at the factory, while the second, indicated by the numeral 32 is generally formed at the time the prescription is filled.

This embodiment of my invention has the advantage that the optical axes of the several fields of the trifocal lens may be so selected that the shoulders 19 and 16 produce substantially no "jump".

A third embodiment of my invention is illustrated on the third sheet of drawings, the finished lens being quite similar to the lens illustrated in Figs. XI and XII; but the method of manufacture being somewhat different. The major portion 35 is again formed with a countersink recess along a portion at least of whose edge is a shoulder 36. Although the method of manufacture of this embodiment permits this shoulder 36 to be continuous about the entire intermediate portion 40 of the trifocal, this is in general objectionable so that usually the shoulder 36 will extend along only a portion of the periphery of the intermediate field 37. The segment 38 is disposed as in the second embodiment and is likewise provided with a buried shoulder 39 as in that embodiment.

The two-part button which is provided with a countersink recess is illustrated in Figs. XIX and XX, the countersink recess being indicated by the numeral 41. The part 42 of the button, which is to form the intermediate field 37, is of glass of index of refraction suitable for that field. This part 42 is received within an opening 43 in a carrier portion 44. In other words, I produce a socket 43 having walls of substantial depth in a selected location within a carrier portion of glass 44. The segment 42 is shaped to accurately fit within the recess or socket 43 and is secured therein as by fusing. The carrier portion 44 is of glass of sensibly the same index of refraction as that of the major blank portion 35. The countersink recess 41 is then formed in one side of this two-part button. The second two-part button shown in Fig. XXI is then produced in similar fashion as the first two-part button. This button has a part 46 of glass of index of refraction suitable for the segment 38, and a part 47 of glass of sensibly the same index of refraction as that of the part 42 of the first button. The two-part button 46, 47 is provided on one side with a spherical surface contrageneric to the countersink 41.

The countersink 41 may overlap the carrier portion 44 both above and below the part 42, and in fact such overlapping is sometimes advisable so as to facilitate insertion of an out-of-round segment, for instance, the segment 38. It will be noted, however, that the less this countersink overlaps the carrier portion 44 the smaller the amount of glass which must be ground away from the carrier portion 44. The composite of the two two-part buttons is then provided with a spherical surface contrageneric to the countersink recess 49 in the major blank portion 50. An arc 51 indicates the spherical surface produced on the composite. This arc must pass through the bounding walls of the socket or recess 43, since nowhere should the glass 47 overlap the glass 44 after this spherical surface (as indicated by the arc 51) has been produced on the composite. The composite is fused in the countersink recess 49 to produce the rough blank illustrated in Fig. XXIV.

As shown by Fig. XXIV the segment 38 is now in finished condition and has the buried shoulder 39 above referred to. The only portion of the glass 47 now remaining is in abutting relation with this shoulder 39. Since the glass 47 is of substantially the same index of refraction as that of the glass 42 it has become substantially integral therewith in the course of the fusing step. The glass 44 is of substantially the same index of refraction as the glass of the major blank portion 50 and has likewise become substantially integral as indicated by the cross-hatching in Fig. XXIV.

The finished lens shown in Figs. XVII and XVIII is produced by forming a continuous optical surface on the segment side of the blank, as indicated by the arc 52 in Fig. XXIV, and by forming a continuous optical surface on the opposite side of the blank. In the present embodiment, the arc 52 defines the convex surface of the finished lens and the arc 53 defines the concave surface of the finished lens.

As above indicated the glass 44 becomes substantially integral with the glass 50 in the fusing step, thus producing the shoulder 36 in the finished lens. Enough glass should preferably be ground away in forming the surface on the segment side of the lens so as to form a knife edge along the greater portion of the lower side of the intermediate segment 37. The same is true in producing the spherical surface indicated by the arc 51 in Fig. XXIII, in that the greater portion of the lower side of the segment 38 should be finished to a knife-like edge. Such a knife-like edge is practically invisible to the wearer of the lens.

The second form of my invention illustrated in Figs. XI to XVI inclusive makes it possible to obtain a knife-like edge along the entire lower outline of both the segment 18 and the intermediate field 17, this knife-like edge in each case extending from the corner down around the bottom of the field or segment and up to the opposite corner. With the form of my invention shown in Figs. XVII to XXIV inclusive, the shoulder extends across the top of the segment 38 or intermediate field 37 and may extend any desired distance down the sides. Both embodiments lend themselves to considerable variation in the placing of the reading segment relative to the intermediate field and furthermore to considerable variation in the dimensions and shapes of the segment and intermediate field.

While I have illustrated and described certain embodiments of my invention it will be understood that my invention may be otherwise embodied and practiced within the scope of the following claims:

I claim:

1. In a method of making a multifocal lens blanks, the steps consisting of forming a countersink in a major piece of lens medium of one index of refraction, producing a composite button by forming an opening having a continuous bounding wall in a minor piece of lens medium of a different index of refraction than the major piece, securing a segment of lens medium of a different index of refraction than the minor piece and different than the major piece in the opening in said minor piece and in abutting relation with the bounding wall of said opening, surfacing one side of said joined minor segment pieces of lens medium with a continuous curve which intersects said bounding wall and to a radius of curvature which controls in part the resultant power of the field formed by said segment, forming an opening with a continuous bounding wall in another piece of lens medium of sensibly the same index of refraction as said major piece of lens medium and to a diameter greater than the diameter of the opening in said minor piece of lens medium, securing a piece of lens medium of sensibly the same index of refraction as the minor piece in said opening and in abutting relation with the bounding wall of said opening, forming a countersink in a side surface of said last named assembled pieces of lens medium substantially to the radius of curvature of the surface formed on the minor and segment pieces of lens medium, securing said composite button in said countersink, forming a surface on the side of said joined pieces of lens medium having the composite button thereon to substantially the same radius of curvature as the curve of the countersink in the major piece of lens medium with the line of said surface passing substantially through the point of intersection of the continuous curve, on said joined minor and segment pieces of lens medium, with the bounding wall of said joined pieces of lens medium, securing said composite structure in the countersink in the major piece of lens medium and forming a curved surface on the side of said major piece of lens medium having the composite structure thereon and simultaneously reducing the lower side of said piece of lens medium of sensibly the same index of refraction as the minor piece to a knifelike edge, said countersink curve in the major piece of lens medium being continuous and the said segment and minor pieces of lens medium both being located to one side of said countersink curve with the segment embedded in the minor piece of lens medium.

2. In a method of making a multifocal lens, the steps consisting of forming a countersink in a major piece of lens medium of one index of refraction, producing a composite button by forming an opening having a continuous bounding wall in a minor piece of lens medium of a different index of refraction than the major piece, securing a segment of lens medium of a different index of refraction than the minor piece and different than the major piece in the opening in said minor piece and in abutting relation with the wall of said opening, surfacing one side of said joined minor and segment pieces of lens medium with a continuous curve which intersects said bounding wall and to a radius of curvature which controls in part the resultant power of the field formed by said segment, forming an opening with a continuous bounding wall in another piece of lens medium of sensibly the same index of refraction as said major piece of lens medium and to a diameter greater than the diameter of the opening in said minor piece of lens medium, securing a piece of lens medium of sensibly the same index of refraction as the minor piece in said opening and in abutting relation with the bounding wall of said opening, forming a countersink in a side surface of said last named assembled pieces of lens medium substantially to the radius of curvature of the surface formed on the minor and segment pieces of lens medium, securing said composite button in said countersink, forming a surface on the side of said joined pieces of lens medium having the composite button thereon to substantially the same radius of curvature as the curve of the countersink in the major piece of lens medium with the line of said surface passing substantially through the point of intersection of the continuous curve, on said joined minor and segment pieces of lens medium, with the bounding wall of said joined pieces of lens medium, securing said composite structure in the countersink in the major piece of lens medium, forming a curved surface on the side of said major piece of lens medium having the composite structure thereon and simultaneously reducing the lower side of said piece of lens medium of sensibly the same index of refraction as the minor piece to a knife-like edge, said countersink curve in the major piece of lens medium being continuous and the said segment and minor pieces of lens medium both being located to one side of said countersink curve with the segment embedded in the minor piece of lens medium and forming a curved surface on the opposite side of said major piece of lens medium to complete the lens.

HARRY W. HILL.